United States Patent
Kremicki et al.

(10) Patent No.: US 10,225,996 B1
(45) Date of Patent: Mar. 12, 2019

(54) CONTROL MODULE FOR A WATER HARVESTING SYSTEM

(75) Inventors: Jeffery J. Kremicki, Cardiff by the Sea, CA (US); Peter J. Woytowitz, San Diego, CA (US)

(73) Assignee: Hunter Industries, Inc., San Marcos, CA (US)

( * ) Notice: Subject to any disclaimer, the term of this patent is extended or adjusted under 35 U.S.C. 154(b) by 1552 days.

(21) Appl. No.: 13/294,060

(22) Filed: Nov. 10, 2011

(51) Int. Cl.
*A01G 25/00* (2006.01)
*G05D 7/00* (2006.01)
*B05B 12/08* (2006.01)
*A01G 27/00* (2006.01)
*G05D 11/00* (2006.01)

(52) U.S. Cl.
CPC .............. *A01G 25/00* (2013.01); *A01G 27/00* (2013.01); *B05B 12/08* (2013.01); *G05D 7/00* (2013.01); *G05D 11/00* (2013.01)

(58) Field of Classification Search
CPC ........ A01G 27/00; A01G 25/00; G05D 11/00; G05D 7/00; B05B 12/08
USPC ..................................................... 239/63–71
See application file for complete search history.

(56) References Cited

U.S. PATENT DOCUMENTS

| | | | |
|---|---|---|---|
| 4,637,547 A * | 1/1987 | Hiniker et al. ................... 239/1 |
| 5,192,426 A * | 3/1993 | DeCoster et al. ............ 210/117 |
| 5,262,936 A * | 11/1993 | Faris ....................... A01G 25/16 239/70 |
| 6,132,138 A * | 10/2000 | Haese .................... A01N 25/00 405/37 |
| 6,721,630 B1 | 4/2004 | Woytowitz .................... 700/284 |
| 6,842,667 B2 | 1/2005 | Beutler et al. ................ 700/284 |
| 6,895,987 B2 * | 5/2005 | Addink et al. ............... 137/78.3 |
| 7,245,991 B1 | 7/2007 | Woytowitz .................... 700/284 |
| 7,289,886 B1 * | 10/2007 | Woytowitz .................... 700/284 |
| 7,621,467 B1 | 11/2009 | Garcia ......................... 239/457 |
| 7,640,079 B2 * | 12/2009 | Nickerson et al. ........... 700/284 |
| 7,665,713 B1 | 2/2010 | Clark ................................ 251/5 |
| 7,748,646 B2 | 7/2010 | Clark ............................ 239/204 |
| 7,861,948 B1 | 1/2011 | Crooks ......................... 239/237 |

(Continued)

OTHER PUBLICATIONS

The Brain Box Control for Rain Water Harvesting, Munro Manufacturing, 2 page product brochure, "REV1110".

(Continued)

*Primary Examiner* — Darren W Gorman
*Assistant Examiner* — Joel Zhou
(74) *Attorney, Agent, or Firm* — Knobbe, Martens, Olson & Bear, LLP

(57) ABSTRACT

A control module for a water harvesting system can be operatively connected to a water level sensor in a water collection cistern, the pump/master valve (P/MV) output port of an irrigation controller, a pump start relay that controls a pump coupled to the cistern, and a pair of master valves that are coupled to station valves for delivering water to a plurality of sprinklers. The control module uses a processor, a plurality of switching circuits, and an operational program stored in a memory to cause the landscape vegetation to be watered with water from the water collection cistern or a municipal water supply, depending on the level of water detected in the water collection cistern. The control module can include a display that can indicate a graphic depiction that represents an actual level of the water in the water collection cistern.

17 Claims, 18 Drawing Sheets

(56) References Cited

U.S. PATENT DOCUMENTS

| | | | |
|---|---|---|---|
| 7,953,517 B1 | 5/2011 | Porter et al. | 700/284 |
| 8,191,307 B2 * | 6/2012 | Donoghue et al. | 47/48.5 |
| 2008/0128030 A1 * | 6/2008 | Lewis | 137/265 |
| 2008/0288116 A1 * | 11/2008 | Nickerson | A01G 25/16 700/284 |
| 2010/0030476 A1 | 2/2010 | Woytowitz et al. | 702/3 |
| 2010/0288375 A1 | 11/2010 | Thomas | 137/358 |
| 2011/0088315 A1 * | 4/2011 | Donoghue | A01G 25/16 47/48.5 |
| 2011/0120564 A1 | 5/2011 | Hilton et al. | 137/2 |

OTHER PUBLICATIONS

Rainwater Handbook, Conservation Technology, 19 pages, "09/11".
"Rain Water Handbook" by Conservation Technology, 21 pages. http://www.conservationtechnology.com/documents/RainwaterHandbook0911.pdf.
"The Brain Box, Control for Rain Water Harvesting" by Munro Manufacturing, 2 pages. http://www.munrocompanies.com/Products/Pump-Controls-and-Protection/Control-Boxes/BrainBox.

* cited by examiner

CONTROL MODULE FOR A WATER HARVESTING SYSTEM

FIELD OF THE INVENTION

The present invention relates to systems and methods of watering turf and other landscape vegetation.

BACKGROUND

Many parts of the world lack sufficient rainfall during certain times of the year to support the heath of turf, shrubs and other forms of landscape vegetation. Therefore residential and commercial irrigation systems have been widely developed and employed. Typically these irrigation systems comprise a user programmable electronic irrigation controller that turns a plurality of valves ON and OFF in accordance with a watering program. The valves are usually connected to either a municipal water supply or a well and deliver water through buried conduits that terminate in risers equipped with sprinklers. Where the water source is a well, the water is typically pressurized via a pump that is actuated by the irrigation controller through a pump start relay.

It is becoming increasingly important to conserve water, both in terms of lessening adverse environmental impacts and saving money. This is particularly true in more densely populated areas and semi-arid regions where water is availability is scarce in the face of high demand. In an effort to conserve water, many municipalities and water districts have imposed strict limitations that specify the days of the week on which landscape watering can take place, as well as the specific times and durations of permissible watering on those days.

Over the past several years efforts have been made by manufacturers of irrigation products to lessen the amount of water utilized by residential and commercial irrigation systems while avoiding brown lawns and dead shrubs. For example, reliable and efficient rotary stream sprinklers have been developed that are replacing wasteful spray-type sprinklers. These rotary stream sprinklers slowly eject a plurality of small streams of water over an adjustable arc instead of a fan shaped spray of water that is ejected by a spray-type sprinkler which is often partially blown away and/or delivered at too high of a rate. An example of a commercially successful rotary stream sprinkler is the MP ROTATOR® sprinkler manufactured and sold by Hunter Industries, Inc., the assignee of the subject application In some cases drip irrigation can be used to substantially reduce the amount of water used for irrigation, but only where particular plants and trees are utilized. Some irrigation controllers use rain sensors to inhibit watering during and after periods or rain fall. One commercially successful example of such a sensor is the RAIN CLIK® sensor also manufactured and sold by Hunter Industries, Inc. Irrigation controllers have also been developed that utilize weather-related information to alter the frequency and/or duration of watering taking local weather conditions into account. Some of these systems rely on subscription services that broadcast local weather data. Others receive such information over the Internet. Still others rely on local environmental sensors contained in a miniature on site weather station. These systems utilize formulas that take into account evapotranspiration (ET). The commercially successful ET System™ components manufactured and sold by Hunter Industries, Inc. can be plugged into an existing irrigation controller such as the I-Core® irrigation controller, also sold by Hunter Industries, Inc. The ET System components gather weather data on site and continuously calculate the ideal watering program for nearby landscape vegetation which is communicated to the irrigation controller.

Efforts have also been made by water districts to encourage homeowners to install landscaping that requires less water than conventional landscaping. However, it is difficult to get homeowners to replace their existing turf and shrubs. Moreover, many homeowners do not like rock gardens and desert plants. The latter type of vegetation can usually only survive in geographic areas with arid climates.

While the foregoing efforts have significantly lessened the amount of water used in residential and commercial irrigation, only so much water can be saved by imposing watering restrictions, improving the efficiency of sprinklers and irrigation controllers, and encouraging the use of drought tolerant landscaping.

SUMMARY OF THE INVENTION

In accordance with the present invention a control module is provided for a water harvesting system. The control module can interface with an output port of an irrigation controller normally used to control a pump or a master valve. The system includes a water collection cistern for collecting and storing rainfall or water from some other auxiliary source. The system further includes a water level sensor in the water collection cistern, a pump coupled to the water collection cistern, a pump start relay connected to the pump, a first master valve coupled to the pump and a second master valve coupled to a point of connection (POC) such as a municipal water supply. The system further includes a plurality of station valves electrically connected to the irrigation controller and coupled to the master valves. A plurality of sprinklers are coupled to the station valves for watering landscape vegetation. The control module can be operatively connected to the water level sensor, the output port of the irrigation controller, the pump start relay, and the master valves and uses a processor, a plurality of switching circuits, and an operational program stored in a memory to cause the landscape vegetation to be watered with water from the water collection cistern or the POC, depending on the level of water detected in the water collection cistern. The control module can include a display that can indicate a graphic depiction that represents an actual level of the water in the water collection cistern. The operational program can allow the display and a manually actuable input device to enable the control module to be manipulated by a user to operate either in a setup mode or in at least one operation mode. The control module can include current sensing circuits that allow the processor to turn OFF the switching circuits if a short is detected in order to prevent damage to the control module. The control module can also include an optical interface that is connectable to the output port of the irrigation controller, an interface circuit that is connectable to the water level sensor, and an interface circuit that is connectable to a flow sensor.

BRIEF DESCRIPTION OF THE DRAWINGS

Throughout the drawings, like reference numerals refer to like parts.

DETAILED DESCRIPTION

Many irrigation sites have "auxiliary sources" of water readily available that can supplement, or in some cases completely replace, the water from municipal water systems or wells normally used to irrigate lawns and other landscape vegetation. For example rain water can be collected and stored in a water collection cistern and later used for irrigation. Rain water is salt free and therefore very beneficial for watering vegetation because it washes away salts present in the soil that can impair healthy plant growth. Ground water run-off can also be collected, stored and later used for irrigation. Condensation from air conditioners and other devices that extract moisture from the ambient air can also be collected in a cistern, stored and later used for irrigation. Grey water can also be collected and used for irrigation purposes. It would be desirable to provide a system and method that would readily allow residential and commercial irrigation systems to utilize auxiliary sources of water to further reduce the demand on municipal water supplies and wells. While the prior art contains examples of systems that allow rain water, ground water run-off and grey water to be used for irrigation purposes, these systems have not provided a convenient and reliable way to interface with an existing irrigation controller. The present invention advantageously provides a water harvesting system and method that allows an existing irrigation controller to utilize auxiliary sources of water to irrigate landscape vegetation.

Figure 1:
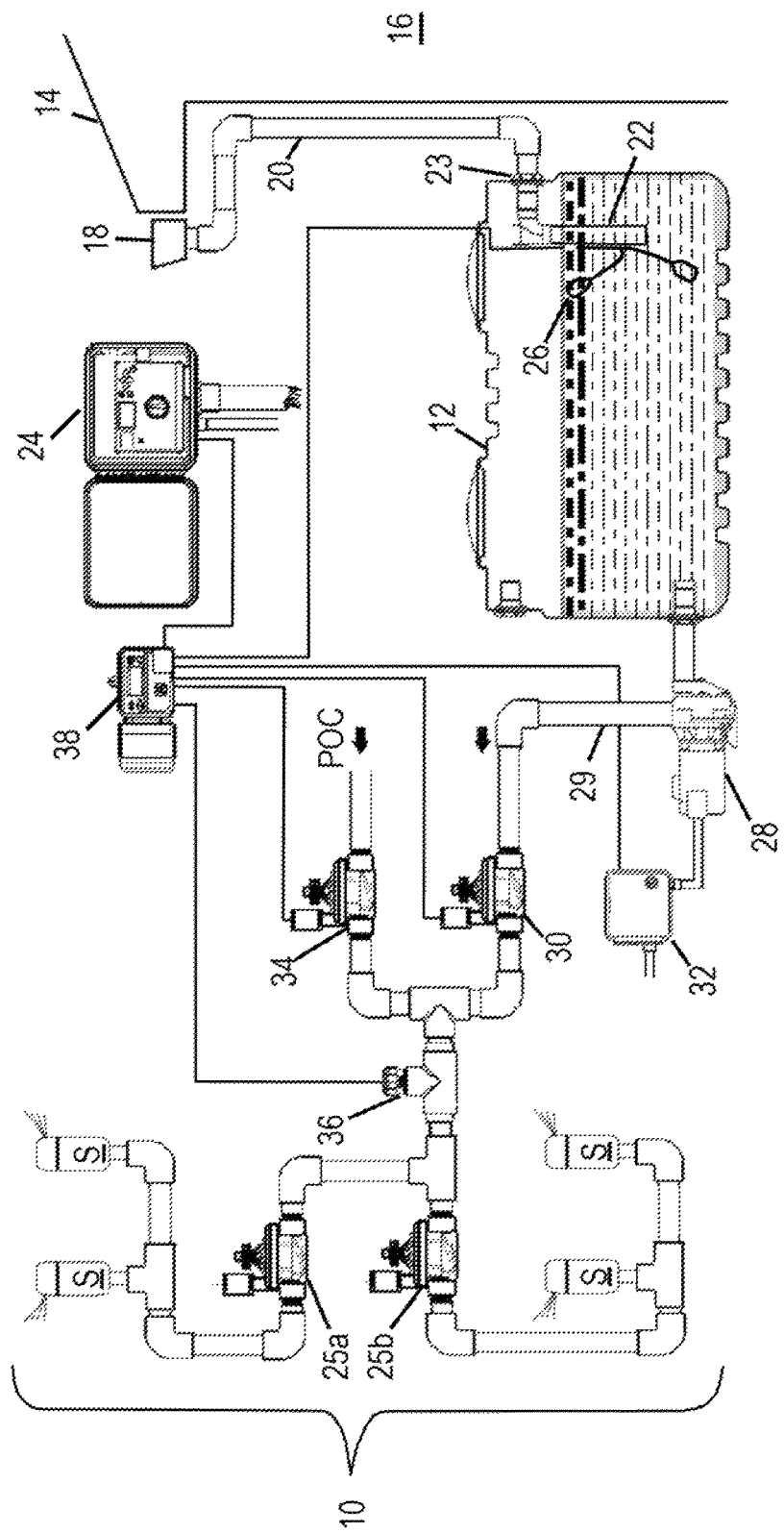
FIG. 1 is a diagrammatic illustration of a rain harvesting system incorporating a control module in accordance with an embodiment of the present invention.

FIG. 1 illustrates a rain water harvesting system 10 that includes a water collection cistern 12 that collects and stores rain water. Rain water periodically falls onto the roof 14 of a building 16, runs down into peripheral gutters 18 and is conveyed into the water collection cistern 12 via drain pipes 20 and an inlet pipe 22. This water is salt free and therefore well suited for use in watering plants. It may be desirable to include a removable filter and settling basin (not illustrated) adjacent the coupling 23 between the drain pipe 20 and the inlet pipe 22 to remove leaves and other debris and to prevent mosquitoes from entering the water collection cistern 12. The water collection cistern 12 is preferably sized to hold hundreds of gallons of water and may be provided in the form of a commercially available, inexpensive durable tank roto-molded out of high-density polyethylene with UV inhibitors. Suitable tanks for use as the water collection cistern 12 are sold in the United States under the NOR-WESCO, ACE ROTO MOLD and SNYDER INDUSTRIES brands. While the term "water collection cistern" is used herein, it should be understood that this term covers any above ground, below ground or partially recessed tank, vessel, bladder, accumulator, pool, pond, lake or other storage reservoir for receiving and temporarily holding a significant amount of water obtained from one or more of the auxiliary sources described above. For example the water collection cistern 12 could be made of steel, concrete or cinder block. Alternatively, the water collection cistern could simply be a pond which may or may not be lined with a layer of water-impervious material.

Figure 2:
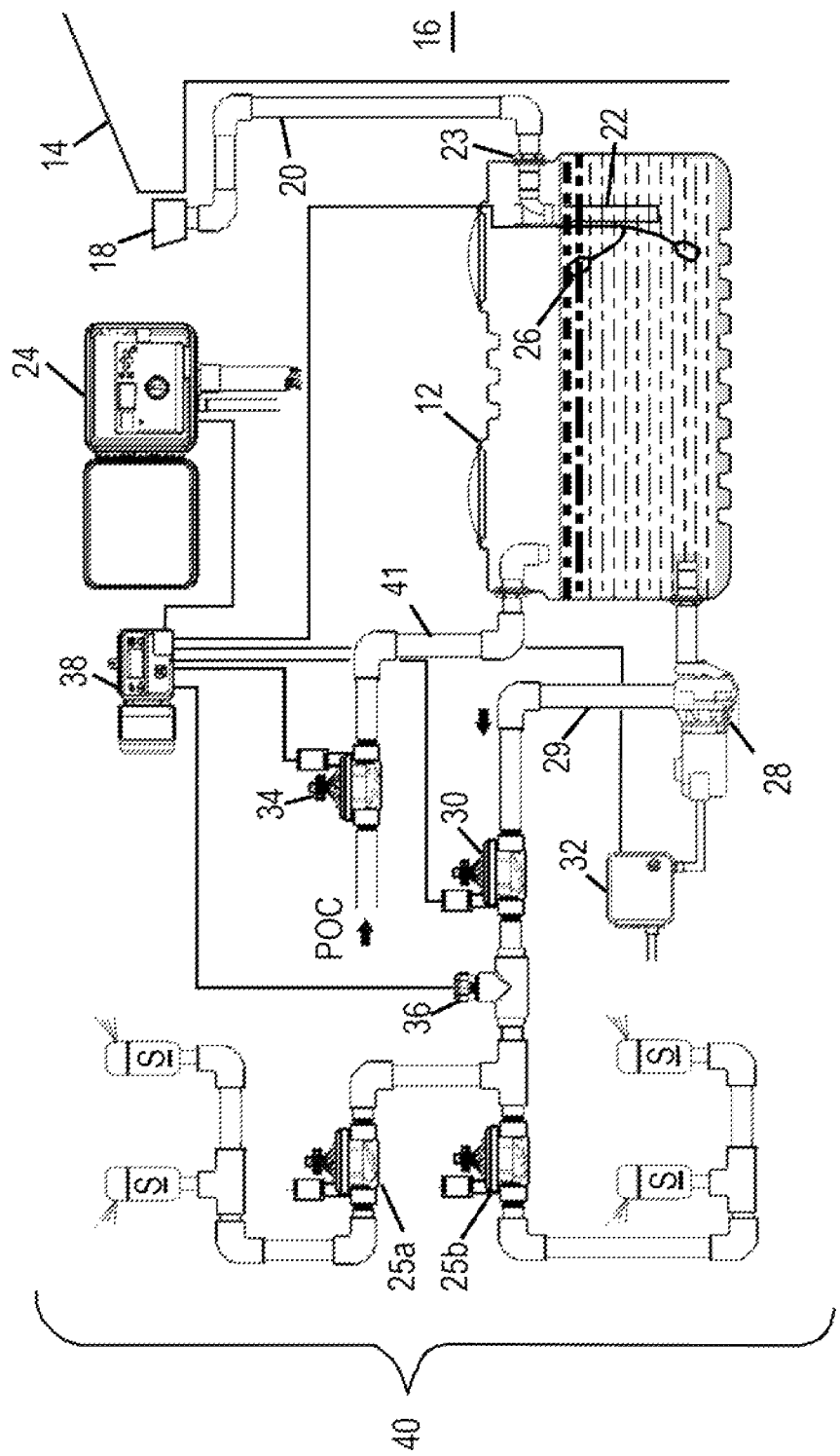
FIG. 2 is a diagrammatic illustration of an alternate configuration of the rain harvesting system that can utilize the control module.

The rain water harvesting system 10 (FIG. 1) further comprises an electronic irrigation controller 24 that can turn a plurality of electrically actuated station valves 25a and 25b ON and OFF in accordance with a watering program. Typically the irrigation controller 24 will control at least four station valves, each representing a corresponding zone of the landscape site that is irrigated via that valve. For simplicity of illustration only two station valves, namely station valves 25a and 25b, are illustrated in FIGS. 1 and 2. One suitable irrigation controller is the Pro-C® irrigation controller manufactured and sold by Hunter Industries, Inc. That controller includes a P/MV output port normally used for connection to a pump start relay or a master valve. The pump start relay turns an electric water pump ON and OFF in order to pump water from a well or other source that is to be applied to a lawn and/or other landscape vegetation through the station valves and sprinklers of the irrigation system. The master valve is a normally closed solenoid actuated valve installed at the water supply point in an irrigation system where water is selectively delivered from a municipal water system to the station valves and then to the sprinklers. Another suitable irrigation controller is the I-Core® controller manufactured and sold by Hunter Industries, Inc. See U.S. Pat. No. 6,721,630 of Woytowitz, U.S. Pat. No. 6,842,667 of Beutler et al., U.S. Pat. No. 7,245,991 of Woytowitz, U.S. Pat. No. 7,953,517 of Porter et al., and Published U.S. Patent Application No. US 2010/0030476 A1 of Woytowitz et al., all assigned to Hunter Industries, Inc., the entire disclosures of all of which are hereby incorporated herein by reference.

The irrigation controller 24 has at least one manual input such as a rotary switch or set of push buttons, and a liquid crystal display (LCD) for entering or selecting a watering program including watering schedules with run times and cycle times. The run times can be increased or decreased and their cycle frequency can be increased or decreased. The aforementioned HUNTER® irrigation controllers have a seasonal adjust feature for quickly making percentage adjustments in the run times. They can also be connected to the HUNTER ET System™ components for varying the watering schedules based on calculated ET using local environmental sensor input. The irrigation controller 24 also has a processor such as a microcontroller for executing the watering program. The irrigation controller 24 further includes switching circuitry operatively connected to the processor and to the station valves 25 for turning the station valves 25a and 25b ON and OFF in accordance with the watering program. A P/MV output port in the irrigation controller 24 is operatively connected to the processor of the irrigation controller 24 for normally directly controlling a pump start relay or a master valve. The irrigation controller 24 includes a power supply that provides a 24 VAC signal that is controlled by the switching circuitry for controlling the station valves 25a and 25b. The station valves 25a and 25b may be of the electrically actuated solenoid and diaphragm type disclosed in U.S. Pat. No. 5,996,608 of Hunter et al., the entire disclosure of which is hereby incorporated by reference. Said patent is also assigned to Hunter Industries, Inc. The station valves 25a and 25b could also be solenoid operated piston-type valves or sleeve valves, by way of example, and not by way of limitation. See, for example, U.S. Pat. No. 7,665,713 of Clark also assigned to Hunter Industries, Inc., the entire disclosure of which is hereby incorporated by reference. Typically the station valves 25a and 25b are mounted in one or more subterranean plastic boxes (not illustrated) buried at the irrigated site. The station valves 25a and 25b are coupled through subterranean pipes to a plurality of sprinklers S which are placed around the irrigation site to uniformly water the turf and/or other landscape vegetation. The sprinklers S are typically located many feet away, e.g. twenty-five feet, from the station valves 25a and 25b. Often each zone will have more than two sprinklers S. However, for purposes of simplicity of illustration, the pipes coupling the sprinklers S and station valves 25a and 25b are very short in FIGS. 1 and 2 and only two sprinklers S are illustrated on each zone. Preferably portions of the sprinklers S are purple in color or otherwise conspicuously marked in order to indicate that they discharge non-potable water to thereby comply with codes and local ordinances. The sprinklers S may be micro-irrigation sprinklers such as drip type sprinklers. Alternatively the sprinklers may be spray type sprinklers, rotary stream sprinklers or rotor-type sprinklers. See for example, U.S. Pat. No. 7,621,467 of Garcia, U.S. Pat. No. 7,748,646 of Clark, and U.S. Pat. No. 7,861,948 of Crooks, the entire disclosures of each of which is hereby incorporated by reference. These three sprinkler patents are each assigned to Hunter Industries, Inc. All of the sprinklers coupled to the same station valve (zone) are preferably of the same type. Preferably the sprinklers that are installed in each zone have matched precipitation rates. Pressure regulators can be utilized either in the station valves, supply pipes or in the sprinklers themselves to ensure uniform coverage and optimum watering efficiency.

Referring still to FIG. 1, a water level sensor 26 is mounted in the water collection cistern 12 for generating a water level signal representing an amount of water stored in the water collection cistern 12. In FIGS. 1 and 2 the water level in the water collection cistern 12 is illustrated by the top of the shaded area shown in the vertical cross-section of the water collection cistern 12. An electric pump 28 is coupled through a pipe to the bottom of the water collection cistern 12 for delivering water to a first electrically actuated master valve 30. The pump 28 may be of the centrifugal type used for irrigation purposes. By way of example, the pump 28 can deliver water from the water collection cistern 12 into pipe 29 at a pressure of between about forty pounds per square inch (PSI) and one-hundred PSI. A pump start relay 32 is operatively connected to the pump 28. The station valves 25a and 25b are coupled to the first master valve 30 and to a second electrically actuated master valve 34 through a flow sensor 36. The master valves 30 and 34 may be solenoid actuated diaphragm valves similar to the station valves 25a and 25b.

A water harvesting control module (WHCM) 38 (FIG. 1), in accordance with an embodiment of the present invention, has an electrical input connected to the water level sensor 26 for receiving the water level signal. The WHCM 38 is operatively connected to the P/MV output port of the irrigation controller 24. The WHCM 38 is also operatively connected to the pump start relay 32 and to the master valves 30 and 34. When the irrigation controller 24 turns the station valves 25a or 25b ON, the contacts in the P/MV output port are energized. The output signal at this port causes the WHCM 38 to turn the first master valve 30 and pump 28 ON provided that there is at least a predetermined minimum level of water stored in the water collection cistern 12 as indicated by the water level sensor 26. When the water level sensor 26 indicates that the level of water in the cistern 12 is below the predetermined minimum level, the WHCM 38 does not turn the first master valve 30 and the pump 28 ON but instead turns the second master valve 34 ON. Water from a point of connection (POC) such as a municipal water supply pipe or a well, is coupled to the master valve 34 and flows through the second master valve 34 and through the flow sensor 36 to the station valves 25a and 25b. Signals from the flow sensor 36 are processed by the WHCM 38 to detect high/low flow conditions indicative of distribution system failures, cistern blockage, etc. Signals from the flow sensor 36 can also be used by the WHCM 38 to tabulate and separately display reports to the user of the total volume of water used for irrigation from the water collection cistern 12 and the POC over a predetermined time period.

It is important that the pump 28 is not energized when the water level in the water collection cistern 12 is too low. In such a state, no water would be delivered to the turf and landscaping as the level of the intake leading to the pump 28 would be at or above the surface of the water remaining in the water collection cistern 12, e.g. one foot of water. Furthermore, under such circumstances the pump 28 could be damaged if it were unable to have the cooling and lubrication provided by water normally flowing through the pump 28 when energized. Thus the programming in the WHCM 38 causes the water harvesting system 10 (FIG. 1) to automatically shift from delivering water from the water collection cistern 12 to the landscaping to delivering water from the POC to the landscaping. This automatic shift occurs, during an irrigation cycle initiated by the irrigation controller 24, when the water level in the water collection cistern 12 drops below the predetermined minimum level, i.e. the level of the intake to the pump 28. In the water harvesting system 10 of FIG. 1, the WHCM 38 does this by shutting OFF pump 28 via the pump start relay 32, turning OFF the first master valve 30 and turning ON the second master valve 34.

Preferably the water collection cistern 12 has an over-flow pipe (not illustrated) coupled near the top of the sidewall thereof that directs excess water out of the water collection cistern 12 and away from the building 16 when the water collection cistern 12 has been filled to a predetermined maximum level. The outlet end of this over-flow pipe should also be provided with a screen to prevent mosquitoes from entering the water collection cistern 12. The cross-sectional area of the over-flow pipe should be at least as large as the cross-sectional area of the drain pipe 20 so that it can expel excess water at a sufficient rate.

FIG. 2 illustrates a rain water harvesting system 40 which is similar in construction to the system 10 of FIG. 1 except that in the system 40 the second master valve 34 is coupled to the water collection cistern 12 instead of the flow sensor 36. The system 40 can also utilize the WHCM 38. The operation of the system 40 is similar to the system 10 except in the following respect. In the system 40, when the signal from the water level sensor 26 indicates that the level of water in the water collection cistern 12 is below the predetermined minimum level, the WHCM 38 turns the second master valve 34 ON to re-fill the water collection cistern 12 from the POC coupled to the master valve 34. Water is delivered from the POC through the second master valve via a supply pipe 41. The WHCM 38 turns the master valve 34 OFF when the signal from the water level sensor 26 indicates that the level of water in the water collection cistern 12 has reached a predetermined maximum level. In the system 40 the turf and landscape vegetation is always watered with water pumped from the water collection cistern. However, in certain situations, some or all of the water used for watering the landscape vegetation comes indirectly from the POC coupled to the second master valve 34.

In the water harvesting system 40 of FIG. 2, as soon as the WHCM 38 detects the fact that the level of water in the water collection cistern 12 has reached the predetermined minimum level during an irrigation cycle, it need not turn OFF the pump 28. Instead, the WHCM can turn ON the second master valve 34 to cause the water collection cistern 12 to be re-filled from the POC. This avoids an incomplete watering of the turf and landscaping during the programmed irrigation cycle. It also avoids damage to the pump 28 that would otherwise result from it running in a dry state. The WHCM 38 can be programmed to turn OFF the second master valve 34 when the output port of the irrigation controller 24 is no longer energized, indicating the end of the irrigation cycle. This maximizes the amount of the volume of the water collection cistern 12 remaining for storage of collected rainfall.

Figure 3:
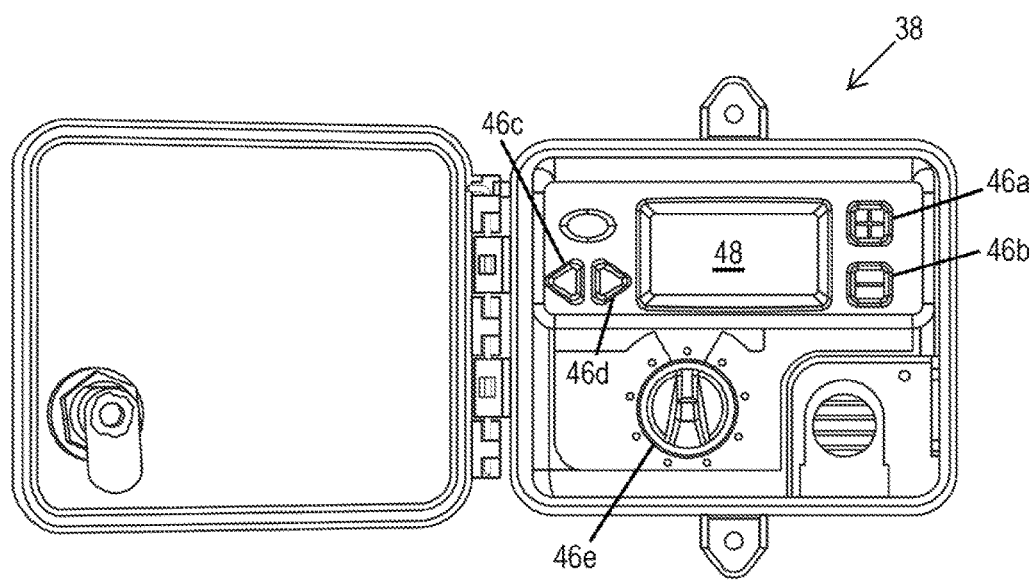
FIG. 3 is an enlarged front elevation view of a preferred embodiment of the water harvesting control module that forms a part of the systems of FIGS. 1 and 2 illustrating the pushbutton switches, rotary switch and display mounted in its control panel.
Figure 4:
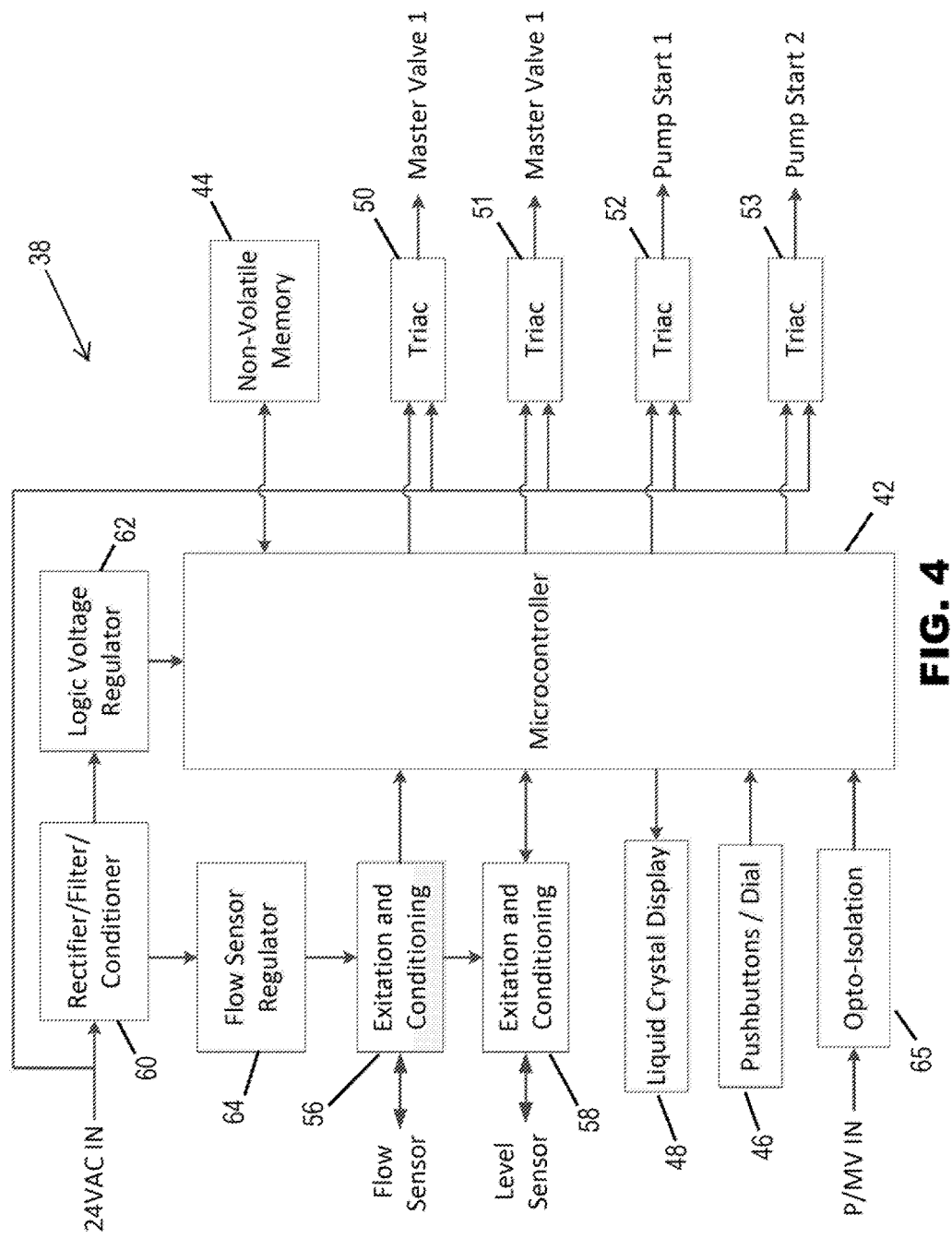
FIG. 4 is a block diagram of the preferred embodiment of the water harvesting control module.

Referring to the block diagram of FIG. 4, the WHCM 38 is connected to the irrigation controller 24 in order to accept the signal from its P/MV output port when that port is energized. This occurs when the processor of the irrigation controller 24 turns ON one of the station valves 25*a* and 25*b*. The WHCM 38 is also connected to the water level sensor 26 in the water collection cistern 12. Additionally, the flow sensor 36 is also connected to the WHCM 38. The WHCM 38 must also be capable of driving at least four external 24 VAC devices in the form of the master valves 30 and 34 and the pump start relay 32. If the POC is a well, the WHCM 38 can turn a second pump start relay (not illustrated) ON and OFF so that a well pump (not illustrated) will deliver water to the second master valve 34. The WHCM 38 has a processor in the form of a microcontroller 42 that is operatively connected to a non-volatile memory 44 so that any setup information is not lost during a power outage. Instead of the microcontroller 42 and the separate memory 44 the system could use a microcomputer having a processor and a memory on the same chip. The WHCM 38 also includes a means for user interaction and feedback. In the illustrated embodiment the WHCM 38 has a plurality of pushbuttons and a rotary dial indicated graphically in FIG. 4 by a box 46. Referring to FIG. 3, the manual controls include plus (+) and minus (−) pushbuttons 46*a* and 46*b*, left (←) and right (→) arrow pushbuttons 46*c* and 46*d*, and a rotary switch 46*e*. The WHCM 38 also includes a liquid crystal display (LCD) 48.

Referring still to FIG. 4, the WHCM 38 includes a plurality of switches in the form of triacs 50, 51 and 52 and 53 that are operatively connected to the microcontroller 42 for allowing the microcontroller to selectively turn the master valve 30, the master valve 34, the pump start relay 32, and an optional pump start relay associated with the POC (not illustrated) ON and OFF. Other forms of solid state switches or mechanical switches could be utilized in place of the triacs 50, 52 and 54. Excitation and conditioning circuitry 56 is operatively connected to the microcontroller 42 for interfacing with the flow sensor 36. Additional excitation and conditioning circuitry 58 is operatively connected to the microcontroller 42 for interfacing with the water level sensor 26. A rectifier/filter/conditioner circuit 60 receives a 24 VAC signal from a terminal strip inside the irrigation controller 24 and supplies a 5 VDC signal to the microcontroller 42 via a logic voltage regulator circuit 60. The rectifier/filter/conditioner circuit 60 also supplies DC power to the excitation and conditioning circuitry 56 via a flow sensor regulator circuit 64. The signal from the P/MV output port of the irrigation controller 24 is supplied to the microcontroller 42 through an opto-isolation circuit 65.

Figure 5A:
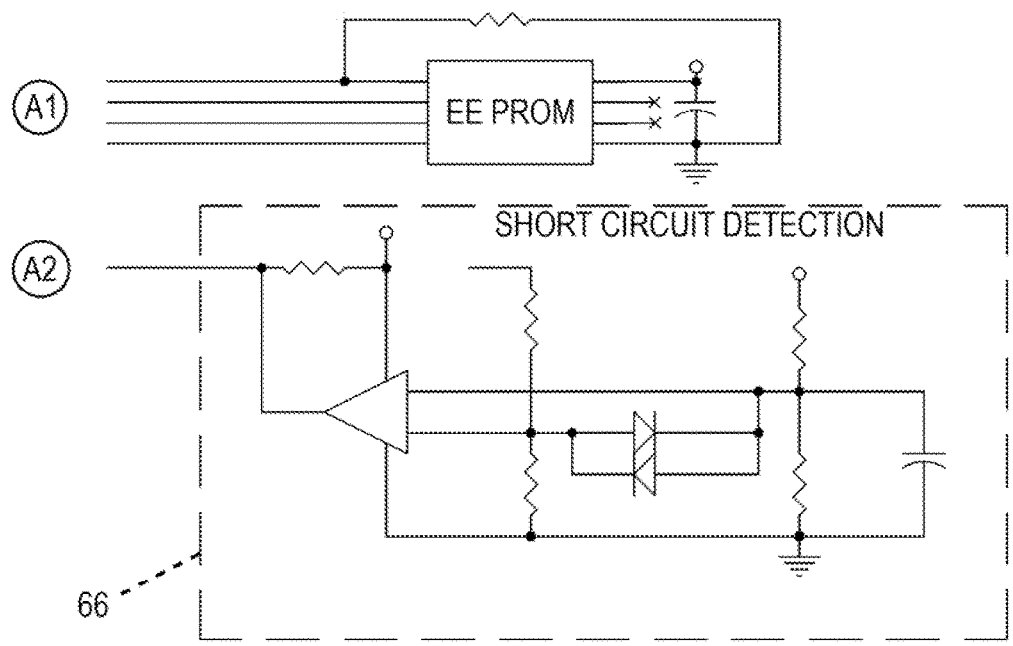
FIGS. 5A-5E collectively form a schematic diagram of the preferred embodiment of the water harvesting control module. The circled letter and numeral combinations indicate the connection of the various conductive paths from figure to figure.
Figure 5B:
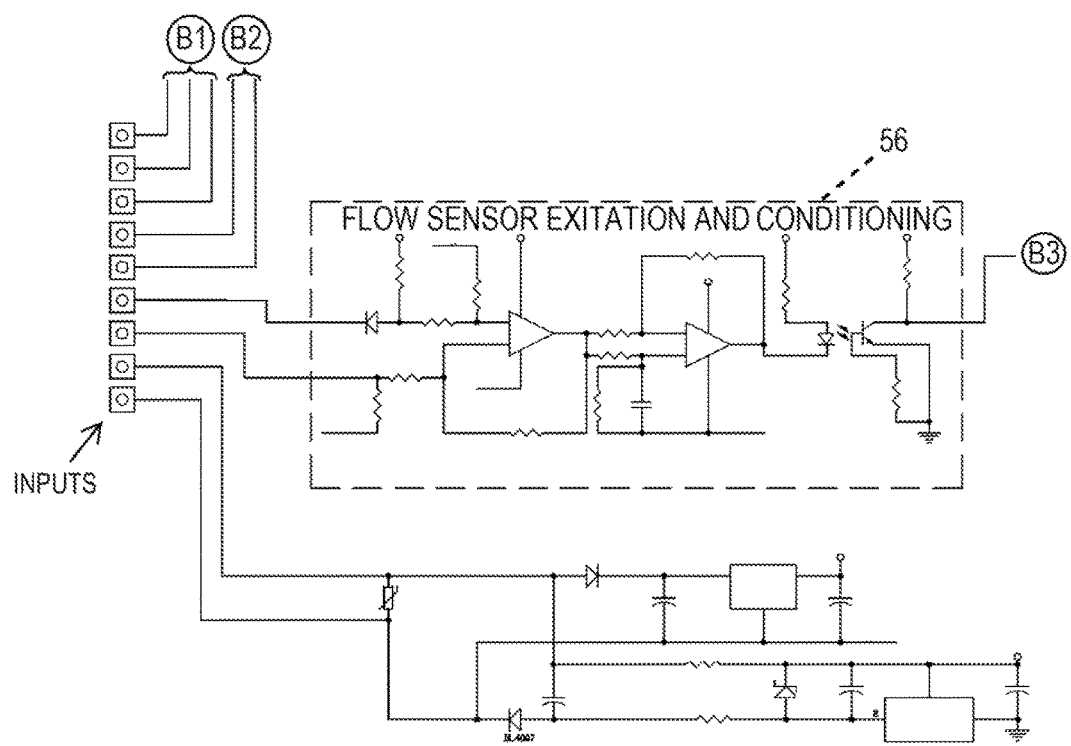
Figure 5C:
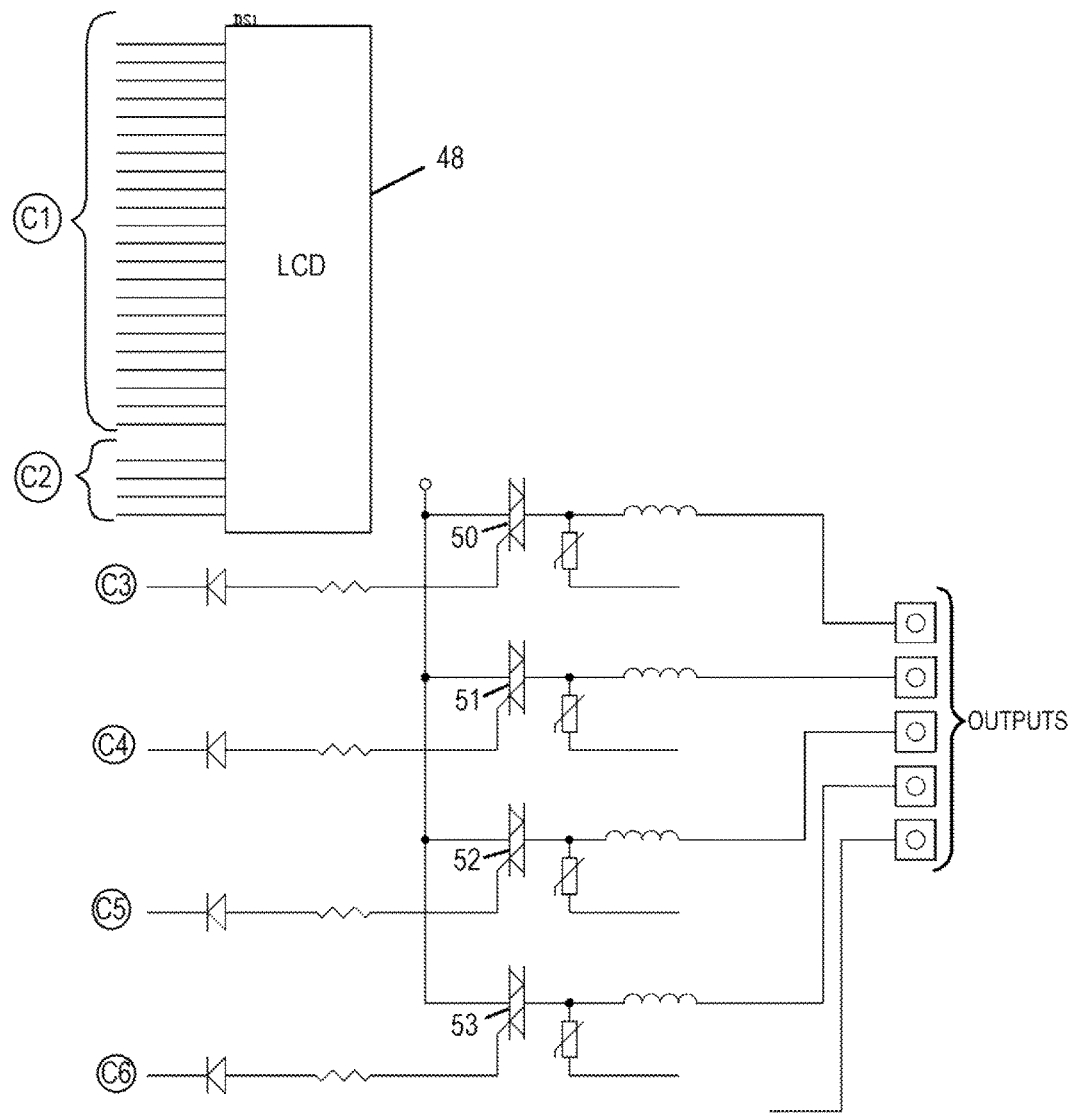
Figure 5D:
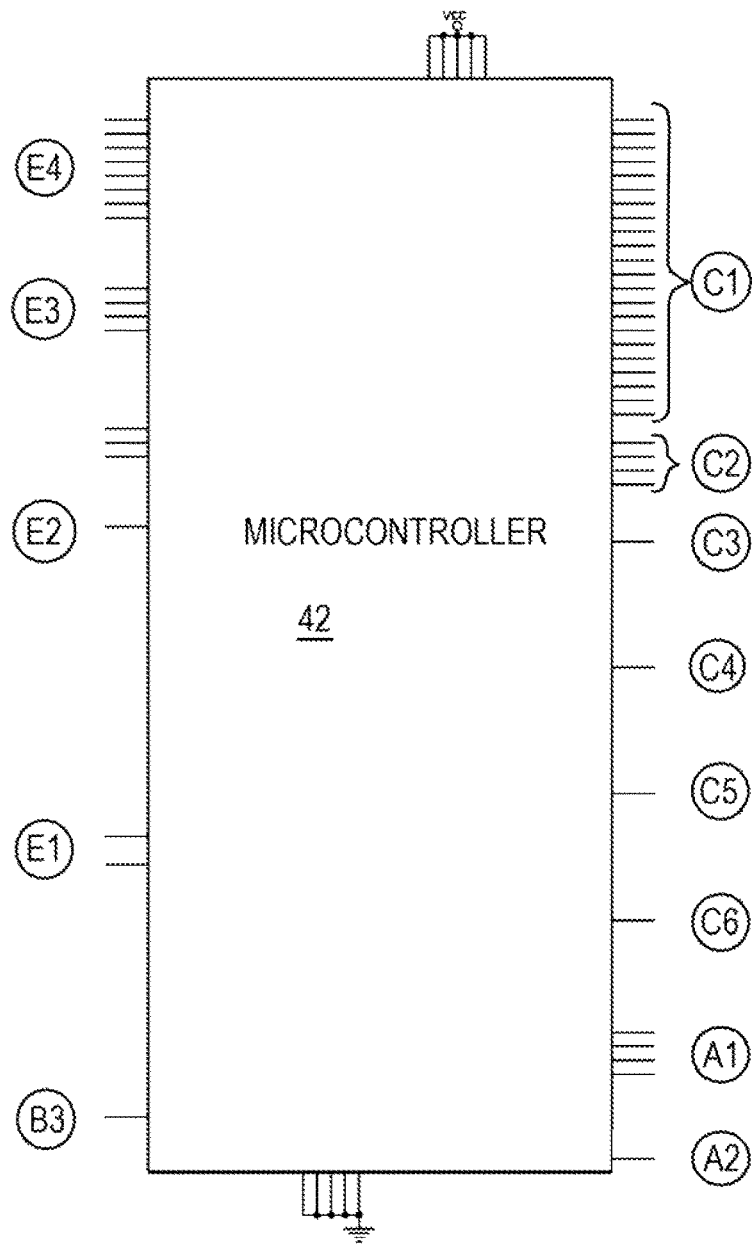

Referring to the schematic diagram of FIGS. 5A-5E, in the illustrated embodiment of the WHCM 38 the rotary switch SW1 (FIG. 5E), and the pushbutton switches SW2-SW5 provide the means for the user to enter information and select options. These switches are read by the microcontroller U1 (FIG. 5D) in the form of a PIC16F1946 device that is commercially available from Microchip Technology Inc. A plurality of 10K resistors R1-R13 (FIG. 5E) provide a pull-up function so that when the various buttons are depressed, or the dial position is selected, the appropriate pin going into the microcontroller U1 will go LOW. The microcontroller U1 provides feedback to the user through the custom LCD DS1 (FIG. 5C). The aforementioned commercial microcontroller has a built-in LCD driver so that it may interface directly to the glass of the LCD 48, and drive its segments and commons accordingly.

Referring still to the schematic diagram of FIGS. 5A-5E, the P/MV output port of the irrigation controller 24 drives an opto-isolator U2 (FIG. 5E), in the form of a 4N25 device commercially available from Fairchild Optoelectronics Group, through a resistor R15 (that limits the current) and a diode D1 (that protects the LED from reverse bias condition). The 24 VAC signal from the irrigation controller 24 modulates the LED of U2, which in turn causes the phototransistor of U2 to turn ON and OFF. Resistor R14 serves as a pull-up resistor so that a square-wave is presented to the pin 30 of the microcontroller U1 whenever the P/MV output port is energized or goes active in some other fashion. This indicates to the WHCM 38 that water is needed, and based on the other inputs, one or more of the outputs of the WHCM 38 will typically be activated.

Figure 5E:
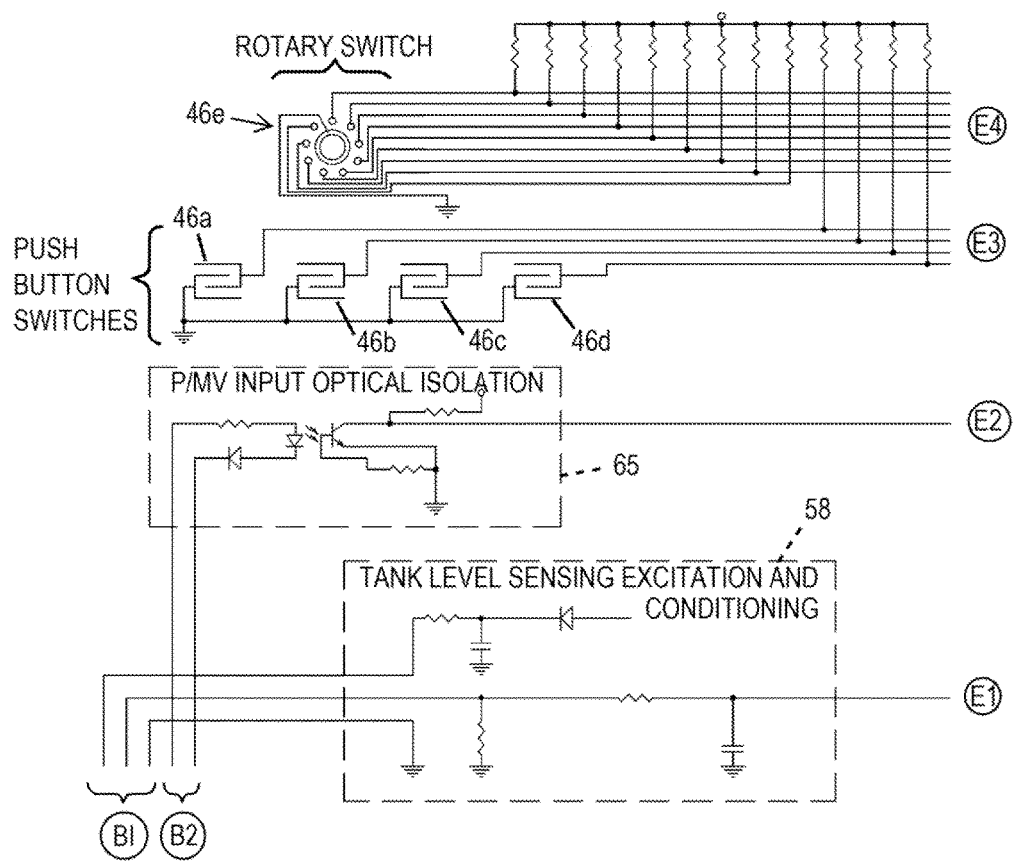

The water level sensor 26 is connected to transmit the "EXCITATION+", "EXCITATION−", and "TANK LEVEL" signals. Referring to FIG. 5E positive excitation voltage is provided by D2 and R23 with C1 acting as a filter capacitor. The negative excitation voltage comes from the ground of the WHCM 38. The 4-20 mA output from the water level sensor 26 drives a 250 ohm resistor R17 which causes a voltage to develop across R17 proportional to the 4-20 mA current. This voltage is input to pin 24 of the microcontroller U1 through a low pass filter comprising R20 and C2. The pin 24 is an analog-to-digital (A/D) input of the microcontroller U1. By reading this A/D input, the microcontroller U1 is capable of determining the water level in the water collection cistern 12. Various water level sensors are commercially available that output a 4-20 mA signal. One such sensor is model number 280-WL400 commercially available from NovaLynx Corporation of Grass Valley, Calif. This particular water level sensor is a submersible pressure transducer that measures water depth by sensing variations in water pressure. Various other water level sensors, such as ultrasonic are available, with similar 4-20 mA outputs.

The flow sensor 36 (FIG. 1) may be a model HFS flow sensor that is commercially available from Hunter Industries, Inc. The HFS flow sensor requires an excitation signal of anywhere from 10 to 30 VDC. The voltage regulator U7 (FIG. 5B) is an LM7824 device that is commercially available from Fairchild Semiconductor. The voltage regulator U7 provides a 24 VDC signal that is used as the excitation supply signal for the HFS flow sensor. This 24 VDC signal is coupled to the leads of the HFS flow sensor through current limiting resistors R26 and R36, and polarity protection diode D7. The HFS flow sensor is a paddle wheel device which draws some constant quiescent current. Each time the paddle wheel rotates, a momentarily higher current is drawn by the HFS flow sensor. This results in a finitely larger voltage drop across R26 and R36 resulting in a small AC voltage signal on the leads of the HFS flow sensor. This signal is processed by a differential amplifier U3A, which is preferably an LM358 device that is commercially available from National Semiconductor. The output of the differential amplifier U3A is a single ended signal which is bit-sliced by a comparator U5A, which is preferably an LM393 device that is also commercially available from National Semiconductor. The output signal of the U5A comparator has a square wave form and a frequency that is proportional to the flow rate of the water in which the HFS flow sensor is immersed. Because the entire 24 VDC supply has a different ground reference than the logic supply, this square wave must go through an isolation or level shifting device before being input to the microcontroller U1. The square wave signal is therefore passed through an opto-isolator U6, which is another 4N25 device, before being processed by the microcontroller U1.

The WHCM 38 must be capable of driving either of the two master valve outputs in addition to either pump start relay output. This is achieved via triacs Q1, Q2, Q3 and Q4 (FIG. 5C), which may be part number T410-600T devices commercially available from ST Microelectronics. These are triggered by the microcontroller U1 through the series combination of a 270 ohm resistor and a diode. This results in about 10-15 mA of trigger current which is sufficient to turn the triacs ON. When turned ON, the triacs Q1, Q2 and Q3 will commutate the current limited (by 0.82 ohm resistor R44) version of the AC1 signal to the appropriate output of the WHCM 38. The AC2 signal is used as the return for these outputs. The outputs of the triacs Q1, Q2 and Q3 are connected to the master valves 30 and 34, and the pump start relay 32 though inductors L1, L2, and L3. These inductors along with metal oxide varistors (MOV) RV1, RV2, and RV3 provide surge protection for the triacs Q1, Q2, Q3 and Q4 in the event of lightening, or some other type of surge.

It is possible for the outputs to the master valves 30 and 34 and the pump start relays to be accidentally shorted, either due to mis-wiring, or due to a fault. The WHCM 38 must therefore provide some sort of protection to prevent the triacs Q1, Q2, Q3 and Q4 from being damaged. This is accomplished with a short circuit detection circuit 66 (FIG. 5A) that includes a comparator U5B, which is the other half of the previously mentioned LM393 device, and associated circuitry. The short circuit detection 66 circuit monitors the current flowing from the outputs of the triacs Q1, Q2, Q3 and Q4, and alerts the microcontroller U1 when a predetermined maximum current is exceeded. The microcontroller U1 can then shut down the appropriate output and alert the user of the fault condition via a text message indicated on the LCD 48. A pair of resistors R41 and R43 set up a reference voltage at the positive input (pin 5) of the comparator U5B. At the same time, a resistor R44 develops a voltage across it that is proportional to the current flowing out of the three 24 VAC outputs of the WHCM 38. This voltage is scaled by a pair of resistors R40 and R42, and applied to the negative input (pin 6) of the comparator U5B. This input is continuously compared to the previously mentioned reference voltage such that any time it exceeds the reference voltage, the output of the compactor goes LOW, alerting the microcontroller U1 of a fault condition.

It is advantageous to store any setup information in the non-volatile memory 44 so that it is not lost in the event of a power outage. This function is provided by U4 (FIG. 5A), which is preferably a 93AA66 device that is commercially available from Microchip Technology. This device communicates with the microcontroller U1, through an industry standard Microwire 3-wire serial interface.

In the preceding description of the schematic diagram of FIGS. 5A-5E, it was assumed that the WHCM 38 will have its own 120/24 VAC transformer (not illustrated). However, if sufficient power is available from the irrigation controller 24, it is possible for the WHCM 38 to use the transformer of the irrigation controller 24 as its 24 VAC source. It was also assumed in the foregoing description of FIGS. 5A-5E that the user interface would consist of a dial and buttons, along with a custom glass LCD. However, with minor modifications, the dial/buttons could be replaced with a keyboard, or various other input devices such as capacitive or inductive touch sensors, or a touchscreen display. The display 48 could be provided in the form of an LCD module with an integral driver or a chip-on-glass (COG) module that could drive a TN, STN, or even TFT color glass display. It was further assumed that the water level sensor 26 is one that outputs a 4-20 mA signal. However, with minor hardware modifications various other types of water level sensors with other signal outputs could be used. These include voltage output, digital, and ratio metric out level sensors. By way of further example, the water level sensor 26 may include a float and a rheostat. The foregoing description of the schematic diagram of FIGS. 5A-5E also assumed that the flow sensor 36 is a Hunter HFS flow sensor, which requires an excitation signal, and draws a modulated current based on the flow through the water pipe. However, with minor hardware modifications various other types of flow sensors may be used such as ultrasonic, pulse, and analog flow sensing devices.

Figure 8A:
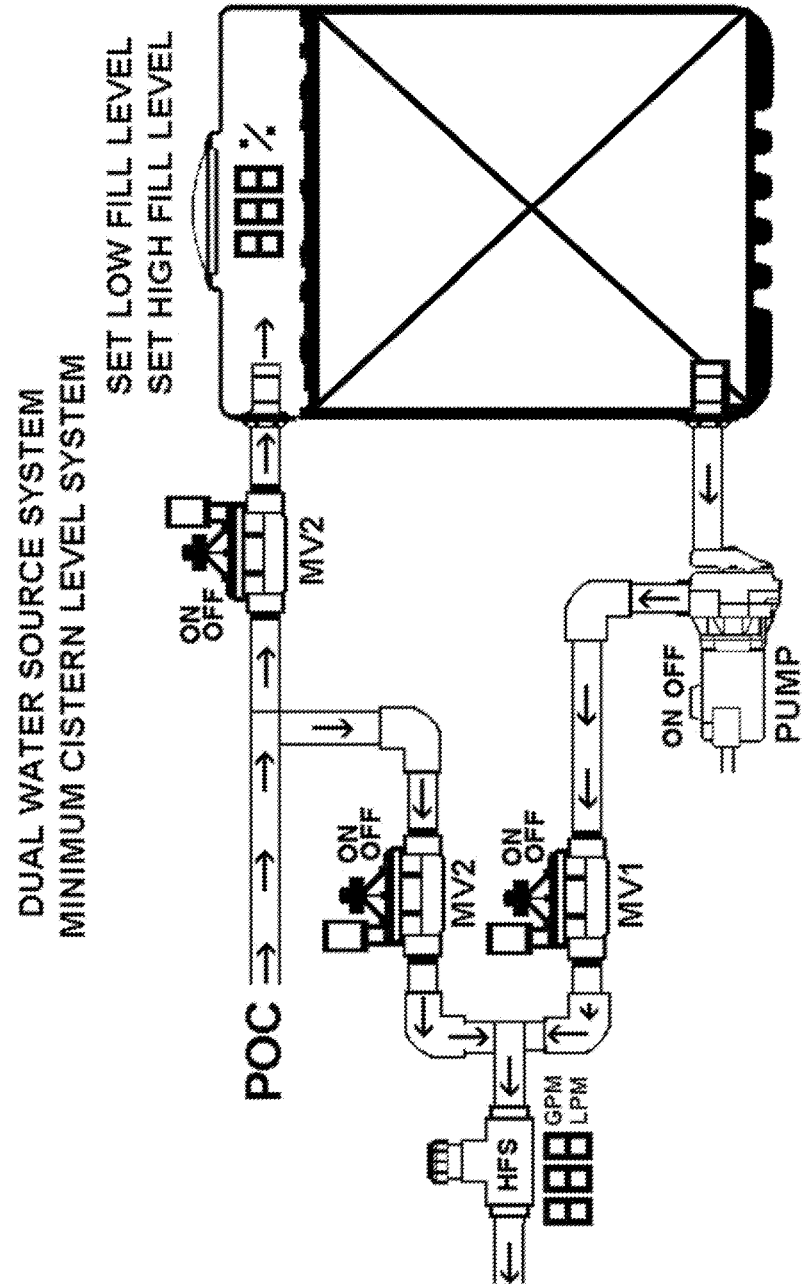
FIGS. 8A-8G are enlarged views of various graphic images that can be indicated on the display of the water harvesting control module of FIGS. 3 and 4.

The LCD 48 (FIG. 5C) of the WHCM 38 preferably depicts graphical images that represent the actual plumbing of the irrigation system and the level of water stored in the water collection cistern 12. FIG. 8A illustrates the LCD 48 with all of its segments ON. During the actual operation of the irrigation system 10, only a subset of the segments will be displayed at any point in time.

System Setup

Figure 6:
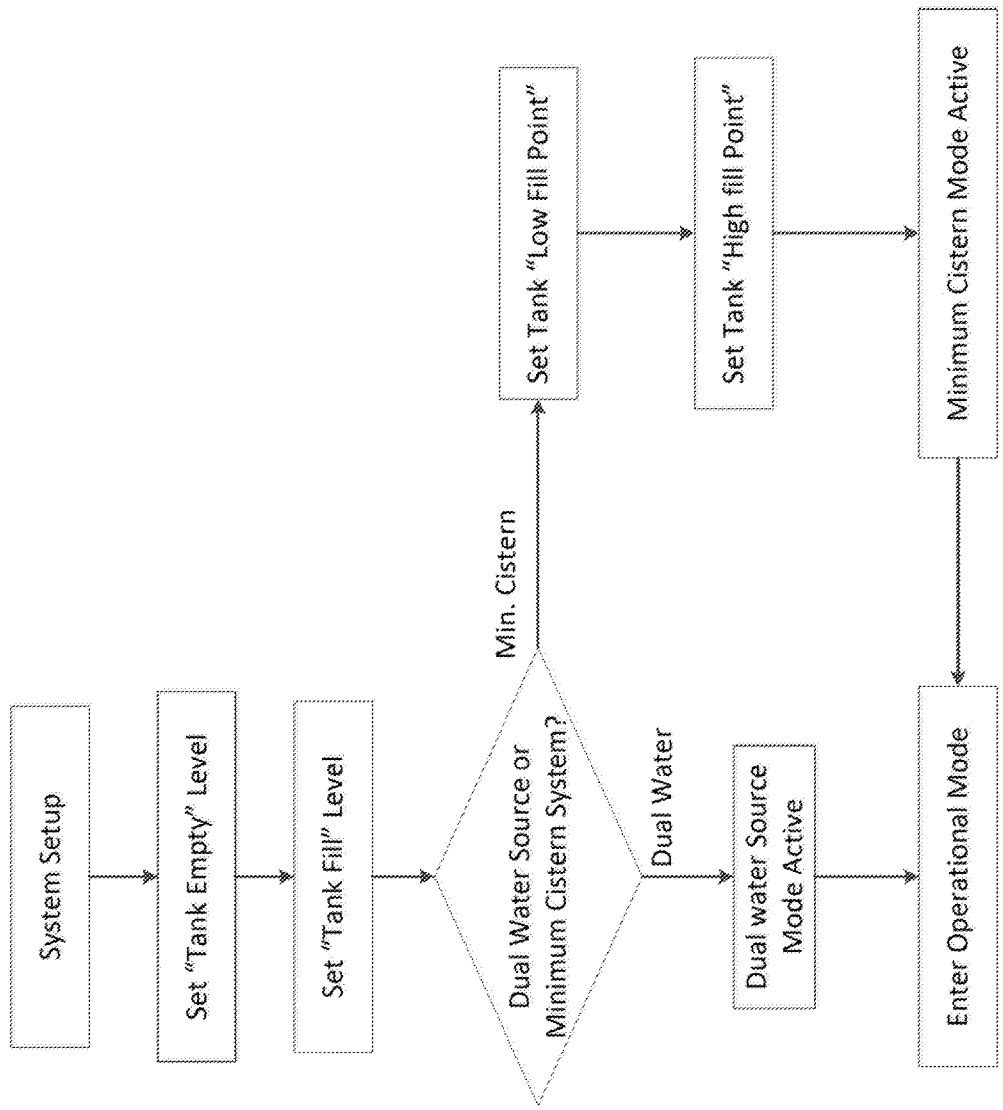
FIG. 6 is a flow chart illustrating the steps of the setup mode of the water harvesting control module of FIGS. 3 and 4.
Figure 8B:
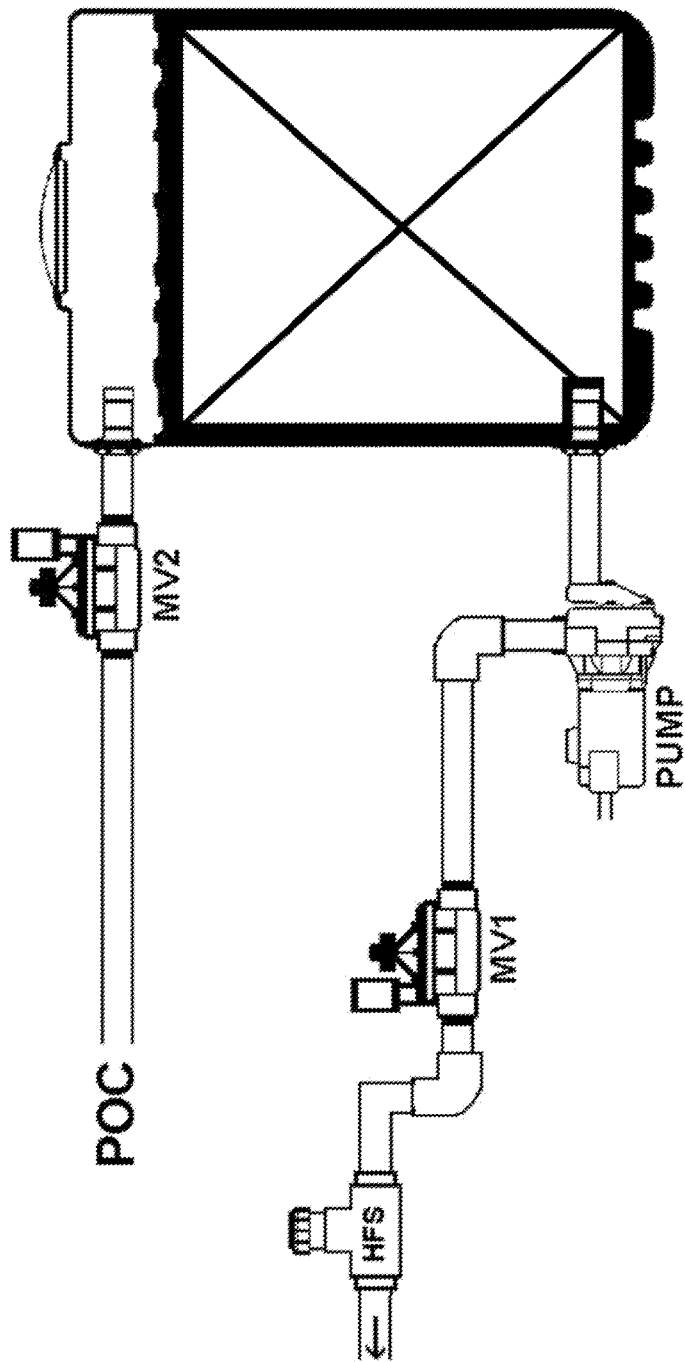
Figure 8C:
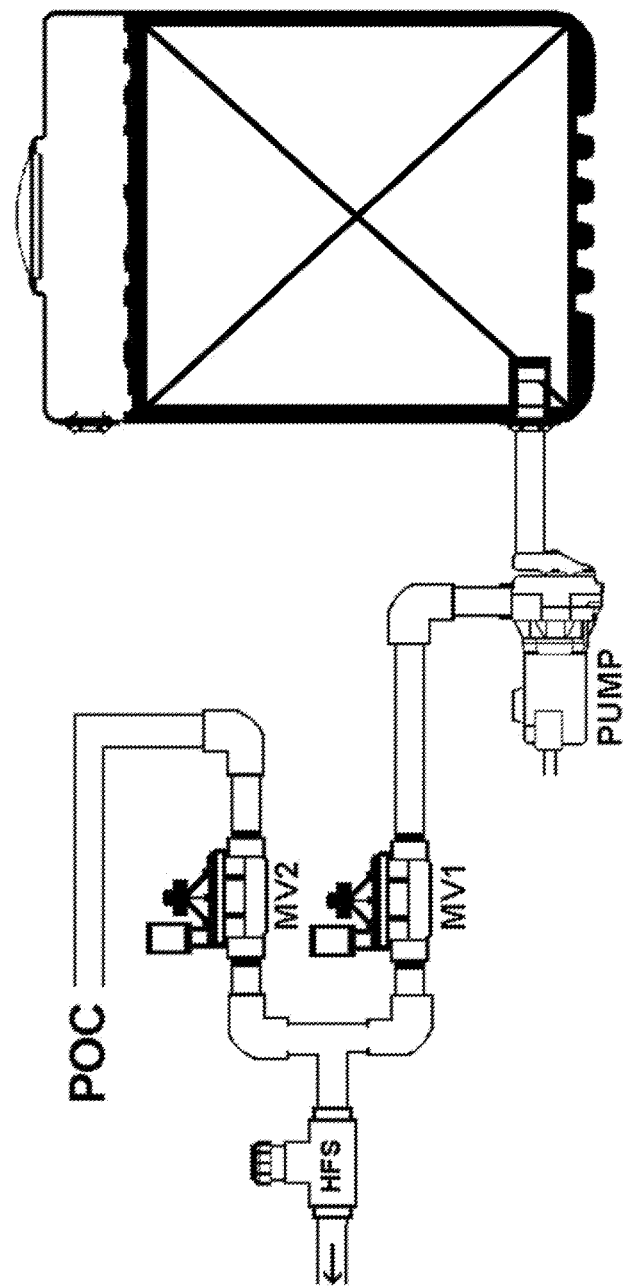

Using the pushbuttons 46a-46d, rotary dial 46e and LCD 48 a user can select one of two possible system setups, namely, either a Minimum Cistern setup or a Dual Water Source setup. The flow chart of FIG. 6 illustrates the logic of the system setup procedure which is part of an operational program of the WHCM 38 that is stored as firmware in the non-volatile memory 44. During this setup procedure, the user is presented with two graphical representations of these system types, and will choose one or the other. FIG. 8B illustrates the graphical image that represents the Minimum Cistern setup. FIG. 8C illustrates the graphical image that represents the Dual Water Source setup.

Operational Modes

Figure 7:
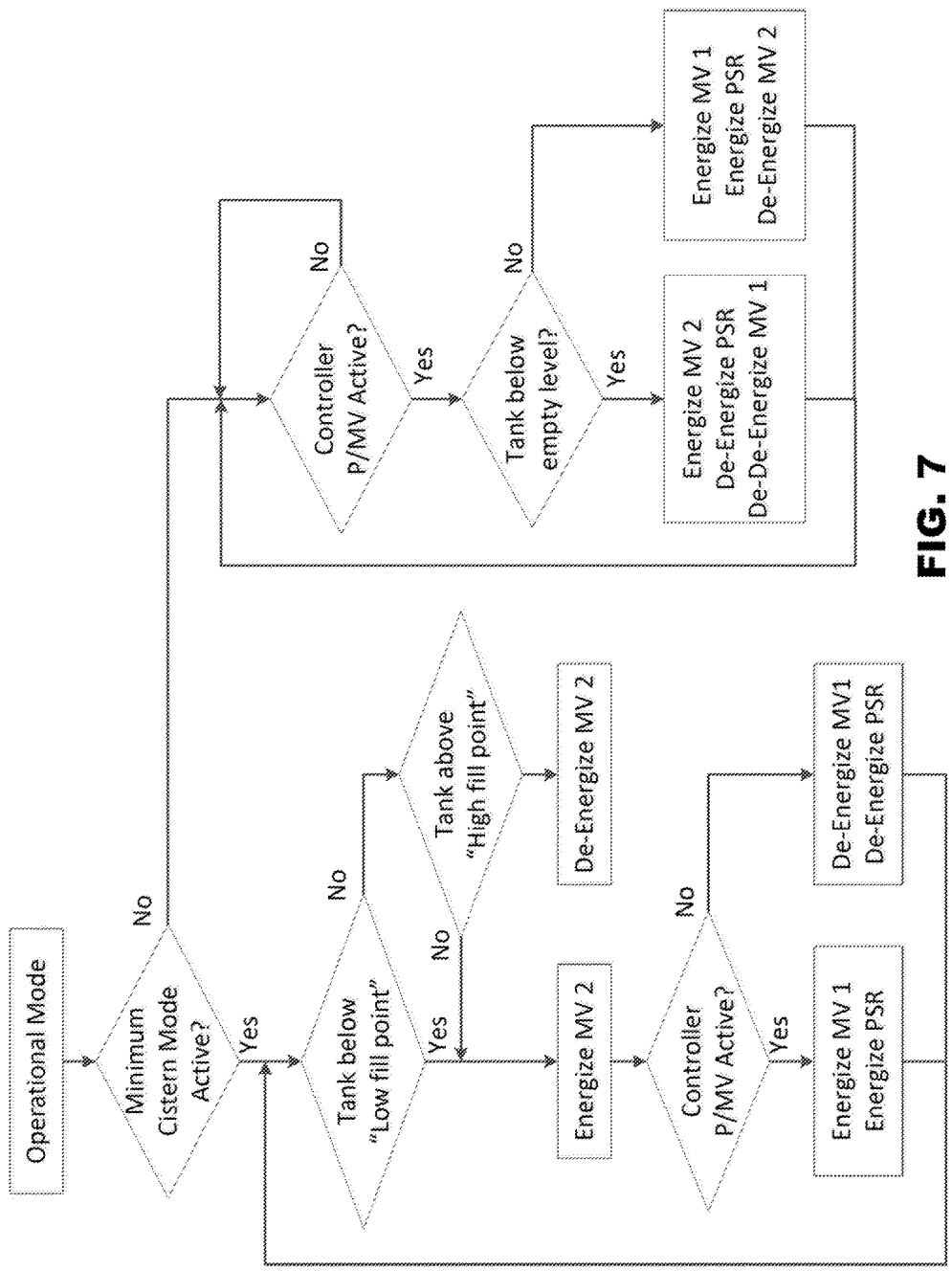
FIG. 7 is a flow chart illustrating the steps of the operational mode of the water harvesting control module of FIGS. 3 and 4.

FIG. 7 is a flow chart illustrating the steps of the operational mode of the WHCM 38. Firmware for executing this logic is part of the operational program stored in the non-volatile memory 44. While the irrigation system is operating (and the P/MV output of the irrigation controller 24 is energized), the LCD 48 of the WHCM 38 provides a live representation of the status of various parts of the system. This includes which valves are ON, which valves are OFF, and the direction of flow of water within the system, along with the level of water in the water collection cistern 12.

Operating Mode—Dual Water Source System—Water from a POC

Figure 8D:
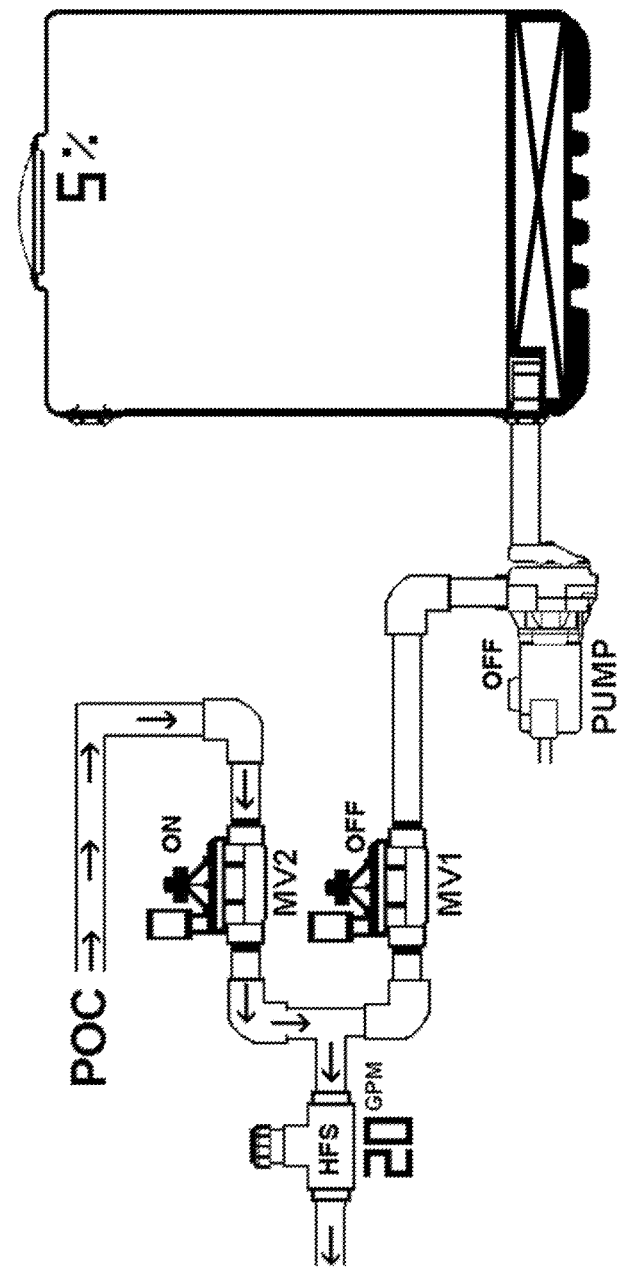

FIG. 8D illustrates the graphical image the user sees on the LCD 48 when the WHCM 38 is configured in the Dual Water Source setup, the cistern level is low, and therefore POC water is being used by the irrigation controller 24 to water the vegetation. In addition to the area inside the water collection cistern 12 that is shaded, the LCD 48 also indicates a numeric "5%" at the top of the cistern. This tells the user that the water collection cistern 12 is only filled to five percent of its water capacity. POC water includes water from a municipal water supply, water from a well, river or lake, or water from another source that is suitable for irrigation purpose. The ON or OFF state of the master valves 30 and 34 and the pump 28 are graphically indicated. The actual cistern water level is also indicated, and the actual water flow direction is indicated by a plurality of arrows inside the appropriate pipe segments. The arrows may be animated, such as by flashing or movement, to depict water flowing from the POC, out through the HFS flow sensor.

Operating Mode—Dual Water Source System—Water from Cistern

Figure 8E:
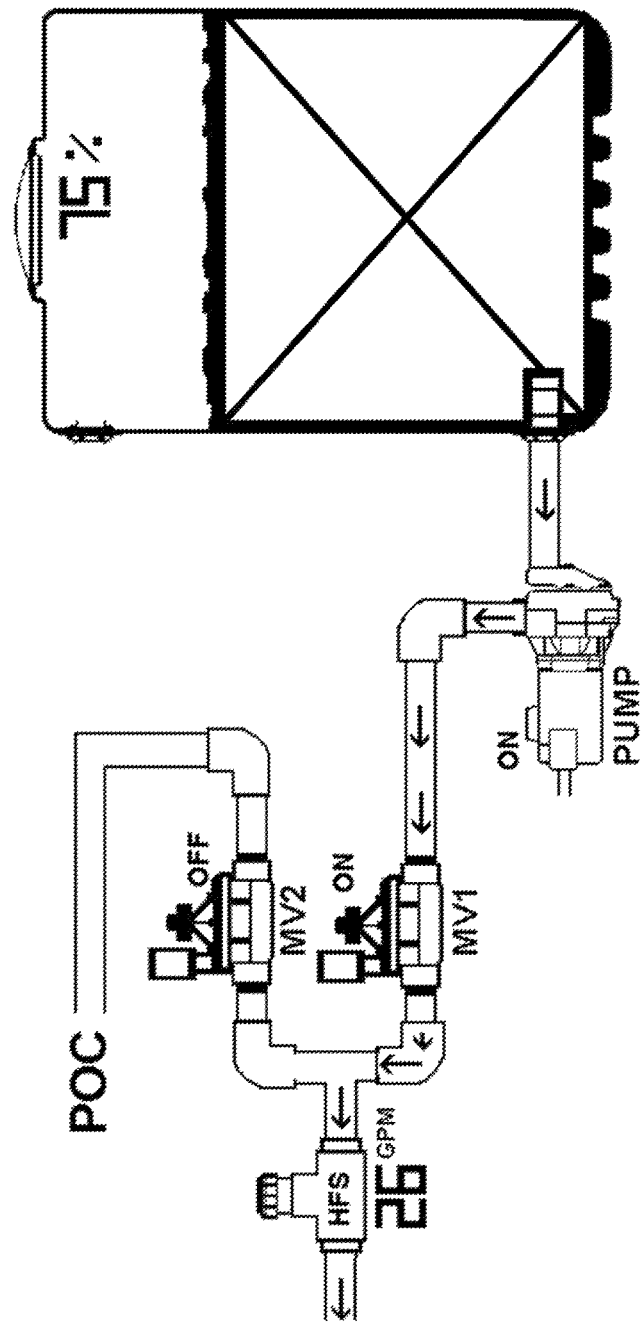

FIG. 8E illustrates the graphical image the user sees on the LCD 48 when the WHCM 38 is configured in the Dual Water Source System, and the cistern level is high enough for the water collection cistern 12 to be used as the source of water for irrigating the vegetation. As in the last example, the graphical image indicates the state of the master valves 30 and 34 and the pump 28. The cistern water level is updated in real time, as is the flow direction. Again, the arrows may be animated.

Operating Mode—Minimum Cistern System, Cistern Filling from the POC

Figure 8F:
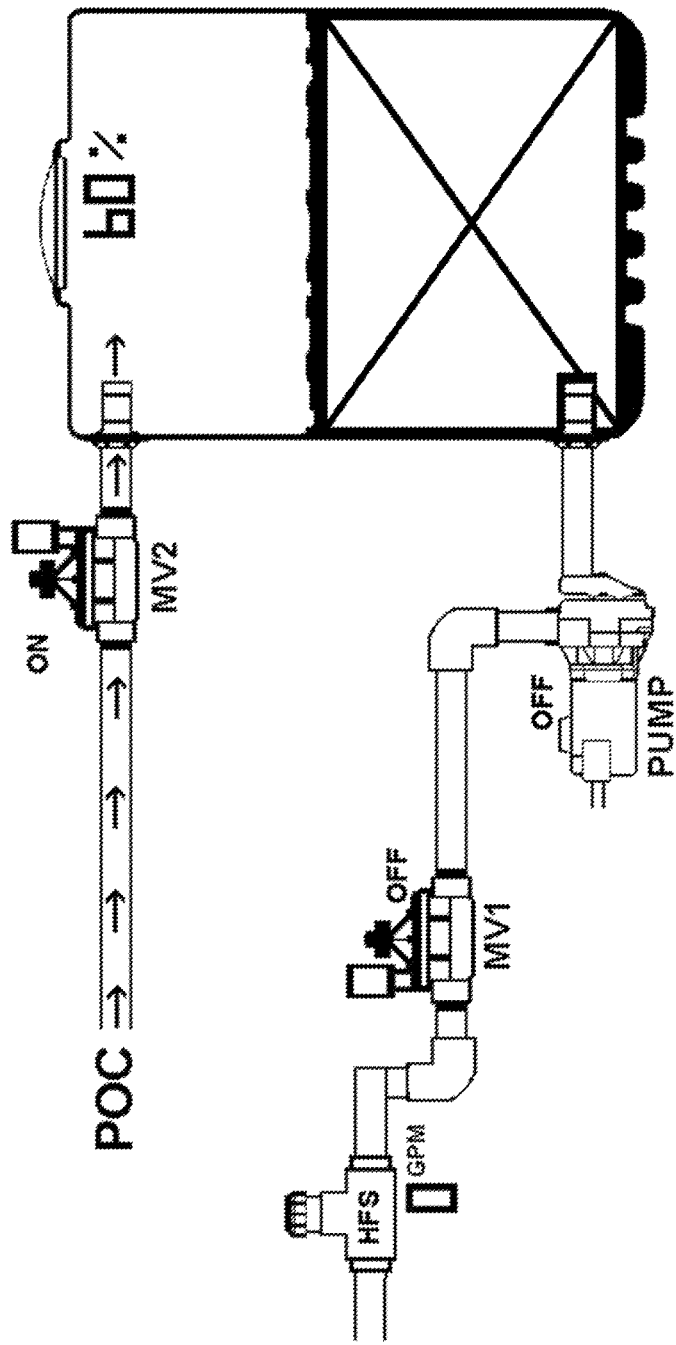

FIG. 8F illustrates the graphical image the user sees on the LCD 48 when the WHCM 38 is configured as a Minimum Cistern System, and the cistern level is low, and therefore POC water is being used to fill the water cistern 12. In this particular example, there is no demand for water by the irrigation controller at this time. The graphical image depicted on the LCD 48 indicates the state of the master valves 30 and 34 and the pump 28, and the cistern water level is updated in real time.

Operating Mode—Minimum Cistern System, Water Demand

Figure 8G:
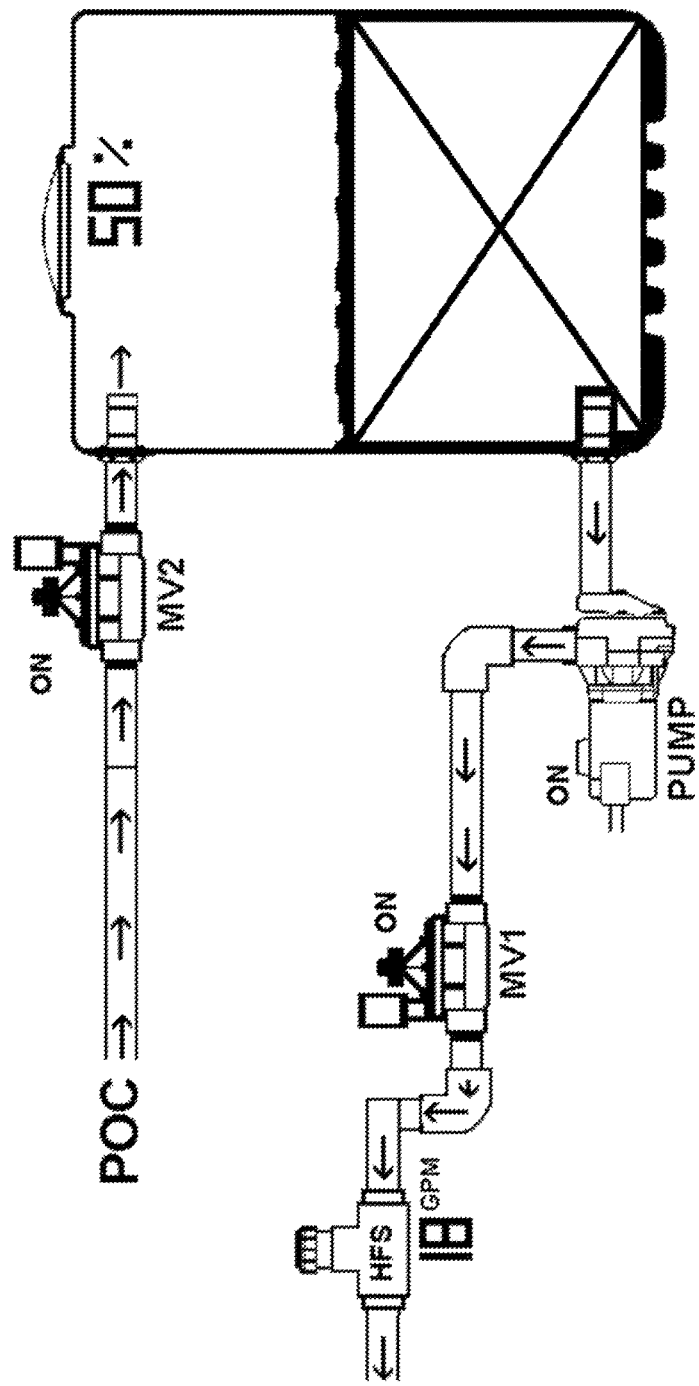

FIG. 8G illustrates the graphical image depicted on the WHCM 38 while it is configured as a Minimum Cistern Level system, and the P/MV output port of the irrigation controller 24 is energized. This results in the irrigation system supplying water from the water collection cistern 12. In this mode water is being pumped from the water collection cistern 12, while the cistern is simultaneously being re-filled from the POC. As illustrated in FIG. 7, the filling operation is independent of the water demand. In other words, any time that the water level in the water collection cistern 12 drops below the predetermined minimum level, the WHCM 38 will supply water to the water collection cistern 12 with water from the POC.

While two configurations of a water harvesting system have been described herein, as well as a water harvesting control module and a method of harvesting water, adaptations and variations thereof will occur to those skilled in the art. For example, while in the systems 10 and 40 the output port of the irrigation controller 24 is energized with a signal, such as a 24 VAC signal, some irrigation controllers have an output port in which a pair of contacts are simply closed to actuate a pump start relay. The WHCM 38 could be configured to work with this type of output port. Alternatively, for irrigation controllers without any pump start relay output port, the WHCM 38 could detect the initiation of an irrigation cycle, i.e. the commencement of a demand for watering, by detecting the 24 VAC signal on one of the terminals of the irrigation controller normally connected to a field valve line, a common line connecting to one or more valves, or on an output terminal of that provides the energization signal in a decoder irrigation controller that uses a multi-wire path to a large number of daisy-chained irrigation valves. The WHCM 38 could also detect the initiation of an irrigation cycle by measuring a pressure drop in the plumbing line of the irrigation circuit upstream of the station valves 25a and 25b indicating an irrigation station valve 25a or 25b is open and supply water is required. The operation of the WHCM 38 may be maintained for the duration of the irrigation event by monitoring flow through the flow sensor 36. The water sensor 26 may be an analogue or a digital sensor. Moreover, two or more sensors may be used to measure the cistern water level with each sensor measuring a different level of water. The water harvesting control module 38 may include more than one sensor input for connection to multiple water level sensors. The cistern pump may be controlled by a pressure switch (not illustrated) that is located between the cistern pump 28 and the master valve 30. In this configuration a pressure drop between the master valve 30 and the pump is detected when the master valve 30 is energized. The pressure switch senses the pressure drop and energizes the pump start relay 32 which in turn energizes the cistern pump 28. In this configuration, the water harvesting module directly controls the master valve 30 but the pump start relay 32 is energized by the pressure switch. As a result, irrigation from the cistern 12 or the POC is controlled by the water harvesting control module 38. The cistern 12 may be elevated high enough above the irrigation system that the water pressure at the sprinklers S is high enough and pump 28 is not necessary. In this configuration the WHCM 38 would control water from the cistern through the master valve 30 and the pump start relay 32 and the pump 28 would not be used. Therefore the protection afforded the present invention should only be limited in accordance with the scope of the following claims.

What is claimed is:

1. A control module for a water harvesting system, the water harvesting system including an irrigation controller having a microcontroller that initiates a watering schedule and a pump/master valve output that provides an energized signal when the watering schedule is initiated, a water collection cistern with a water level sensor, a pump coupled to the water collection cistern, a pump start relay connected to the pump, a first master valve coupled to the pump, a second master valve coupled to a point of connection (POC), a plurality of station valves electrically connected to the irrigation controller and coupled to at least one of the first and second master valves, and a plurality of sprinklers coupled to the plurality of station valves for watering landscape vegetation, the control module comprising:

an operator interface configured to allow a user to enter user preferences, the operator interface comprising a display and at least one manually actuable input device configured to accept user input indicative of one of at least a first operational mode and a second operational mode and to provide an indication of the user-indicated operational mode;

an input circuit, separate from the operator interface, operably connectable to the pump/master valve output of the irrigation controller, and configured to receive the energized signal from pump/master valve output of the irrigation controller when the watering schedule is initiated, the input circuit further configured to provide a watering indication responsive to the receipt of the energized signal;

wherein the energized signal from the pump/master valve output of the irrigation controller is the only signal communicated between the irrigation controller and the control module;

a memory configured to store an operational program;

a processor operably connected to the at least one manually actuable-input device and the memory, and configured to execute the operational program, the processor further configured to receive the indication of the user-indicated operational mode from the operator interface, to receive a signal representative of a water level in the water collection cistern detected by the water level sensor, and to receive the watering indication from the input circuit;

a first switching circuit, separate from the input circuit, operatively connected to the processor and connectable to the pump start relay, the first switching circuit configured to energize the pump start relay to control the pump;

a second switching circuit, separate from the input circuit, operatively connected to the processor and connectable to the first master valve, the second switching circuit configured to turn the first master valve ON and OFF to direct a flow of water; and a third switching circuit, separate from the input circuit, operatively connected to the processor and connectable to the second master valve, the third switching circuit configured to turn the second master valve ON and OFF to direct the flow of water;

wherein when the watering indication indicates that the irrigation controller has initiated the watering schedule and the water level sensor indicates that the water level in the water collection cistern is above a threshold, the processor causes the first switching circuit to energize the pump start relay, the second switching circuit to turn ON the first master valve, and the third switching circuit to turn OFF the second master valve to water the landscape vegetation with water from the water collection cistern;

wherein when the watering indication indicates that the irrigation controller has initiated the watering schedule, the water level sensor indicates that the water level in the water collection cistern is below the threshold, and the indication of the user-indicated operational mode indicates the first operational mode, the processor causes the first switching circuit to de-energize the pump start relay, the second switching circuit to turn OFF the first master valve, and the third switching circuit to turn ON the second master valve to water the landscape vegetation with water from the POC; and wherein when the watering indication indicates that the irrigation controller has initiated the watering schedule, the water level sensor indicates that the water level in the water collection cistern is below the threshold, and the indication of the user-indicated operational mode indicates the second operational mode, the processor causes the first switching circuit to energize the pump start relay, the second switching circuit to turn ON the first master valve, and the third switching circuit to turn ON the second master valve to provide water from the POC to the water collection cistern and to water the landscape vegetation with water from the water collection cistern.

2. The control module of claim 1 further comprising a display configured to indicate a graphical representation of the water collection cistern with a simulated water level that represents an actual water level in the water collection cistern.

3. The control module of claim 1 wherein the processor is further configured to detect when any one station valve of the plurality of station valves has been turned ON.

4. The control module of claim 1 further comprising a sensing excitation and conditioning circuit operatively connected to the processor and connectable to the water level sensor.

5. The control module of claim 2 wherein the operational program is further configured so that the display graphically indicates a state of the first and second master valves.

6. The control module of claim 2 wherein the operational program is further configured so that the display graphically indicates the flow of water through a plurality of pipes of the water harvesting system.

7. The control module of claim 2 wherein the operational program is further configured so that the display graphically indicates a state of the pump.

8. The control module of claim 1 further comprising a sensing excitation and conditioning circuit operatively connected to the processor and connectable to a flow sensor.

9. The control module of claim 1 further comprising a detection circuit configured to detect a short by monitoring a current flow through the first, second, and third switching circuits, wherein the operational program is configured to turn OFF a shorted switching circuit to prevent damage upon detection of the short.

10. The control module of claim 1 wherein the operational program allows the control module to operate in either a system setup mode or at least one operational mode.

11. A control module for a water harvesting system, the water harvesting system including an irrigation controller housed in a first enclosure, the irrigation controller including a microprocessor and an output port that provides an energized signal when the microprocessor of the irrigation controller initiates a watering schedule, a water collection cistern with a water level sensor, a pump coupled to the water collection cistern, a pump start relay connected to the pump, a first master valve coupled to the pump, a second master valve coupled to a point of connection (POC), a plurality of station valves electrically connected to the irrigation controller and coupled to the first and second master valves, and a plurality of sprinklers coupled to the plurality of station valves for watering landscape vegetation, the control module comprising:

a first circuit operably connected to the output port of the irrigation controller and configured to receive the energized signal from the output port of the irrigation controller when the watering schedule is initiated, and to provide a watering indication responsive to the receipt of the energized signal;

wherein the energized signal from the output port of the irrigation controller is the only signal communicated between the irrigation controller and the control module;

a memory configured to store an operational program;

a processor operably connected to the memory and configured to execute the operational program, the processor further configured to receive a signal representative of a water level in the water collection cistern detected by the water level sensor and to receive the watering indication from the first circuit;

at least one manually actuable input device, separate from the first circuit, operably connected to the processor, and configured to accept user input indicative of a setup mode or at least one operational mode;

a display configured to display the setup mode or the at least one operational mode;

a plurality of switching circuits, separate from the first circuit, operatively connected to the processor and connectable to the pump start relay, the first master valve, and the second master valve, the plurality of switching circuits configured to energize the pump start relay to control the pump, and to turn the first and second master valves ON and OFF to direct a flow of water; and a second enclosure configured to house at least the first circuit, the memory, the processor, the display, the at least one manually actuable input device, and the plurality of switching circuits, the second enclosure separate from the first enclosure of the irrigation controller;

wherein when the watering indication indicates that the irrigation controller has initiated the watering schedule and the water level sensor indicates that the water level in the water collection cistern is above a threshold, the processor causes the plurality of switching circuits to energize the pump start relay, to turn ON the first master valve, and to turn OFF the second master valve to water the landscape vegetation with water from the water collection cistern; and wherein when the watering indication indicates that the irrigation controller has initiated the watering schedule and the water level sensor indicates that the water level in the water collection cistern is below the threshold, the processor causes the plurality of switching circuits to de-energize the pump start relay, to turn OFF the first master valve, and to turn ON the second master valve to water the landscape vegetation with water from the POC.

12. The control module of claim 11 wherein the first circuit is operatively connectable to a pump/master valve (P/MV) output port of the irrigation controller.

13. The control module of claim 11 further comprising a sensing excitation and conditioning circuit operatively connected to the processor and connectable to the water level sensor.

14. The control module of claim 11 further comprising a sensing excitation and conditioning circuit operatively connected to the processor and connectable to a flow sensor.

15. The control module of claim 11 and further comprising a second circuit for detecting a short by monitoring a current flow through each of the plurality of switching circuits and wherein the operational program is configured to turn OFF a shorted switching circuit to prevent damage upon detection of the short.

16. The control module of claim 11 wherein the operational program can cause the display to indicate a graphical representation of the water collection cistern with a simulated water level that represents an actual water level in the water collection cistern.

17. A control module for a water harvesting system, the water harvesting system including an irrigation controller housed in a first enclosure, the irrigation controller including a microprocessor and an output port that provides an energized signal when microprocessor of the irrigation controller initiates a watering schedule, a water collection cistern with a water level sensor, a pump coupled to the water collection cistern, the pump start relay connected to the pump, a first master valve coupled to the pump, a second master valve coupled to a point of connection (POC), a plurality of station valves electrically connected to the irrigation controller and coupled to receive water pumped by the pump, and a plurality of sprinklers coupled to the plurality of station valves for watering landscape vegetation, the control module comprising:

a first circuit operably connected to the output port of the irrigation controller and configured to receive the energized signal from the output port of the irrigation controller when the watering schedule is initiated, and to provide a watering indication responsive to the receipt of the energized signal;

wherein the energized signal from the output port of the irrigation controller is the only signal communicated between the irrigation controller and the control module;

a memory configured to store an operational program;

a processor operably connected to the memory and configured to execute the operational program, the processor further configured to receive a signal representative of a water level in the water collection cistern detected by the water level sensor and to receive the watering indication from the first circuit;

a display;

at least one manually actuable input device, separate from the first circuit, operably connected to the processor, and configured to accept user input indicative of a setup mode or at least one operational mode;

a plurality of switching circuits, separate from the first circuit, operatively connected to the processor and connectable to the pump start relay, the first master valve, and the second master valve, the plurality of switching circuits including a first switching circuit configured to energize the pump start relay to control the pump, a second switching circuit configured to turn the first master valve ON and OFF to direct a flow of water, and a third switching circuit configured to turn the second master valve ON and OFF to direct the flow of water; and a second enclosure configured to house at least the first circuit, the memory, the processor, the display, the at least one manually actuable input device, and the plurality of switching circuits, the second enclosure separate from the first enclosure of the irrigation controller;

wherein the operational program is configured so that the processor can cause the landscape vegetation to be watered with water from one of the water collection cistern and the POC based at least in part on the level of water detected in the water collection cistern and whether the irrigation controller has initiated the irrigation schedule, and the display can be used in conjunction with the manually actuable input device to operate and display the setup mode or the at least one operational mode.

* * * * *

UNITED STATES PATENT AND TRADEMARK OFFICE
CERTIFICATE OF CORRECTION

PATENT NO. : 10,225,996 B1  
APPLICATION NO. : 13/294060  
DATED : March 12, 2019  
INVENTOR(S) : Kremicki et al.

Page 1 of 1

It is certified that error appears in the above-identified patent and that said Letters Patent is hereby corrected as shown below:

In the Drawings

Sheet 4 of 18 (Reference Numeral 56) (FIG. 4), Line 1, change "Exitation" to --Excitation--.

Sheet 4 of 18 (Reference Numeral 58) (FIG. 4), Line 1, change "Exitation" to --Excitation--.

In the Specification

Column 1, Line 47, change "application" to --application.--.

In the Claims

Column 15, Line 49, in Claim 15, after "claim 11" delete "and".

Signed and Sealed this
Eighteenth Day of June, 2019

Andrei Iancu
*Director of the United States Patent and Trademark Office*